United States Patent
Pribanic et al.

(10) Patent No.: US 10,323,640 B2
(45) Date of Patent: Jun. 18, 2019

(54) FUEL FILTER ASSEMBLY WITH BRUSHLESS DC PUMP

(71) Applicant: Clarcor Engine Mobile Solutions, LLC, Franklin, TN (US)

(72) Inventors: Justin R. Pribanic, Broad Brook, CT (US); Hassan Ariyan Obahi, West Springfield, MA (US)

(73) Assignee: Clarcor Engine Mobile Solutions, LLC, Franklin, TN (US)

( * ) Notice: Subject to any disclaimer, the term of this patent is extended or adjusted under 35 U.S.C. 154(b) by 335 days.

(21) Appl. No.: 15/187,123

(22) Filed: Jun. 20, 2016

(65) Prior Publication Data
US 2016/0369797 A1    Dec. 22, 2016

Related U.S. Application Data

(60) Provisional application No. 62/182,232, filed on Jun. 19, 2015.

(51) Int. Cl.
*F04C 29/00* (2006.01)
*F04C 23/00* (2006.01)
(Continued)

(52) U.S. Cl.
CPC .......... *F04C 29/045* (2013.01); *B01D 35/143* (2013.01); *B01D 36/005* (2013.01);
(Continued)

(58) Field of Classification Search
CPC ...... F02M 37/08; F02M 37/10; F02M 37/106; F04C 2240/808; F04C 23/008;
(Continued)

(56) References Cited

U.S. PATENT DOCUMENTS

| 4,580,951 A | 4/1986 | Carleton et al. |
| 4,726,746 A | 2/1988 | Takada et al. |

(Continued)

FOREIGN PATENT DOCUMENTS

| EP | 2336541 B1 | 11/2017 |
| JP | 07259676 | 10/1995 |

(Continued)

OTHER PUBLICATIONS

Brown, Ward "Brushless DC Motor Control Made Easy," Microchip Technology, Inc., 2002, retrieved from http://ww1.microchip.com/downloads/en/AppNotes/00857a.pdf.

(Continued)

*Primary Examiner* — Peter J Bertheaud
(74) *Attorney, Agent, or Firm* — Alix, Yale & Ristas, LLP (57) ABSTRACT

The disclosed lift pump employs a unique arrangement of conductive studs to transmit the three phases of motor power from the control board to the brushless motor. The conductive studs penetrate the wall of the motor/pump enclosure, which is otherwise non-conductive. The conductive studs are intentionally larger than needed to transmit the current used by the motor, and are arranged in thermal contact with heat conductive portions of the motor control board to transmit heat from the control board into the motor/pump enclosure where heat is transmitted to fuel passing through the assembly. An additional center heat sink is situated in a position aligned with heat generating capacitors that are part of the motor drive circuitry on the motor control board.

14 Claims, 10 Drawing Sheets

(51) Int. Cl.
| | |
|---|---|
| *F04C 29/04* | (2006.01) |
| *F02M 37/08* | (2006.01) |
| *F02M 37/10* | (2006.01) |
| *F04D 13/08* | (2006.01) |
| *F04D 25/08* | (2006.01) |
| *F04D 29/58* | (2006.01) |
| *B01D 36/00* | (2006.01) |
| *H02K 11/00* | (2016.01) |
| *H02K 11/33* | (2016.01) |
| *F02M 37/24* | (2019.01) |
| *B01D 37/04* | (2006.01) |
| *F02M 59/12* | (2006.01) |
| *F02M 59/44* | (2006.01) |
| *F04C 2/10* | (2006.01) |
| *F04C 14/08* | (2006.01) |
| *F04C 15/00* | (2006.01) |
| *F02M 37/22* | (2019.01) |
| *F04C 2/344* | (2006.01) |
| *H02K 9/22* | (2006.01) |
| *H02K 7/14* | (2006.01) |
| *B01D 35/143* | (2006.01) |
| *F02D 41/30* | (2006.01) |
| *F02M 37/44* | (2019.01) |
| *F02D 41/00* | (2006.01) |

(52) U.S. Cl.
CPC ......... *B01D 37/04* (2013.01); *F02D 41/3082* (2013.01); *F02M 37/08* (2013.01); *F02M 37/10* (2013.01); *F02M 37/106* (2013.01); *F02M 37/22* (2013.01); *F02M 37/24* (2019.01); *F02M 37/44* (2019.01); *F02M 59/12* (2013.01); *F02M 59/44* (2013.01); *F04C 2/102* (2013.01); *F04C 2/3447* (2013.01); *F04C 14/08* (2013.01); *F04C 15/008* (2013.01); *F04C 15/0061* (2013.01); *F04C 15/0096* (2013.01); *F04C 23/008* (2013.01); *F04D 13/086* (2013.01); *F04D 25/082* (2013.01); *F04D 29/5813* (2013.01); *H02K 7/14* (2013.01); *H02K 9/22* (2013.01); *H02K 11/0094* (2013.01); *H02K 11/33* (2016.01); *F02D 41/0025* (2013.01); *F02M 2037/082* (2013.01); *F04C 29/0092* (2013.01); *F04C 2240/808* (2013.01)

(58) Field of Classification Search
CPC ...... F04C 29/045; F04D 13/06; F04D 13/064; F04D 13/086; F04D 25/082; F04D 29/5813; F04D 29/628
USPC .... 417/369, 410.3, 410.5, 422, 423.3, 423.8
See application file for complete search history.

(56) References Cited

U.S. PATENT DOCUMENTS

| | | | |
|---|---|---|---|
| 4,830,576 A | 5/1989 | Patrick | |
| 4,955,790 A | 9/1990 | Nakanishi et al. | |
| 4,978,282 A | 12/1990 | Fu et al. | |
| 4,998,865 A | 3/1991 | Nakanishi et al. | |
| 5,053,664 A | 10/1991 | Kikuta et al. | |
| 5,120,201 A | 6/1992 | Tuckey et al. | |
| 5,145,329 A | 9/1992 | Zumbusch et al. | |
| 5,156,535 A * | 10/1992 | Budris | F04D 13/06 277/405 |
| 5,356,272 A | 10/1994 | Nagata et al. | |
| 5,392,750 A * | 2/1995 | Laue | B01D 35/027 123/509 |
| 5,454,697 A | 10/1995 | Nakanishi | |
| 5,534,161 A | 7/1996 | Tarr et al. | |
| 5,613,844 A | 3/1997 | Tuckey et al. | |
| 5,842,454 A | 12/1998 | Miwa et al. | |
| 5,899,193 A | 5/1999 | Betz, II et al. | |
| 6,068,454 A | 5/2000 | Gaston et al. | |
| 6,514,404 B1 | 2/2003 | Bauer | |
| 6,619,933 B2 * | 9/2003 | Ikeda | F04B 39/06 417/410.1 |
| 6,652,249 B2 | 11/2003 | Kenney et al. | |
| 6,701,900 B1 | 3/2004 | Millar et al. | |
| 6,769,889 B1 | 8/2004 | Raney et al. | |
| 6,881,328 B2 | 4/2005 | Dittmann et al. | |
| 7,179,066 B2 | 2/2007 | Good et al. | |
| 7,418,951 B2 | 9/2008 | Hazama | |
| 7,473,079 B2 * | 1/2009 | Ogawa | F01C 21/10 417/410.1 |
| 7,576,503 B2 | 8/2009 | Nakanishi et al. | |
| 8,049,376 B2 | 11/2011 | Dokas et al. | |
| 8,157,542 B2 | 4/2012 | Boutros | |
| 8,188,624 B2 | 5/2012 | Noh et al. | |
| 8,242,725 B2 | 8/2012 | Thompson et al. | |
| 8,388,322 B2 | 3/2013 | Scharfenberg | |
| 8,415,855 B2 | 4/2013 | Li et al. | |
| 8,622,722 B2 | 1/2014 | Li et al. | |
| 8,901,797 B2 | 12/2014 | Castle et al. | |
| 9,169,833 B2 * | 10/2015 | McCormick | F04D 5/002 |
| 2004/0184942 A1 | 9/2004 | Phillips | |
| 2006/0153706 A1 | 7/2006 | Barth | |
| 2007/0295311 A1 | 12/2007 | McCue et al. | |
| 2008/0253899 A1 | 10/2008 | Nakanishi | |
| 2010/0116253 A1 | 5/2010 | Furuhashi et al. | |
| 2011/0052428 A1 | 3/2011 | Tarancioglu | |
| 2011/0200477 A1 | 8/2011 | Chua | |
| 2011/0266205 A1 | 11/2011 | Reyinger et al. | |
| 2012/0020810 A1 | 1/2012 | Stiles, Jr. et al. | |
| 2012/0073545 A1 | 3/2012 | Worthington et al. | |
| 2012/0245819 A1 | 9/2012 | Graf | |
| 2013/0002080 A1 | 1/2013 | Achor | |
| 2013/0153487 A1 | 6/2013 | Terry et al. | |
| 2013/0230418 A1 | 9/2013 | Dkazono | |
| 2013/0320788 A1 | 12/2013 | Sakai et al. | |
| 2013/0330206 A1 | 12/2013 | Walters | |
| 2014/0353262 A1 | 12/2014 | Troxler | |
| 2015/0204327 A1 | 7/2015 | Pribanic | |

FOREIGN PATENT DOCUMENTS

| | | |
|---|---|---|
| KR | 20140146697 A | 12/2014 |
| WO | 9301874 A1 | 2/1993 |
| WO | 2010118486 A1 | 10/2010 |

OTHER PUBLICATIONS

International Search Report and Written Opinion dated Sep. 12, 2016 (PCT/US2016/038357).

Supplementary European Search Report dated Nov. 30, 2018 for European Patent Application No. 16812618.3.

* cited by examiner

FUEL FILTER ASSEMBLY WITH BRUSHLESS DC PUMP

BACKGROUND

The disclosure relates to fuel delivery systems and pumps employed to circulate fuel through filter assemblies.

Lift pumps are low-pressure supply pumps that transmit fuel to a high-pressure pump. In most fuel supply systems for diesel internal combustion engines, electric motor-driven lift pumps are used to push or pull fuel through filter assemblies and deliver a specified volume of clean fuel at a specified pressure to downstream fuel system components such as high pressure pumps feeding fuel injection systems. Lift pumps may be incorporated into fuel filter assemblies or arranged separately. Most prior art lift pumps are driven by simple DC motors having a constant output, resulting in fuel flow at a constant rate. It is common for prior art fuel delivery systems to employ a mechanical regulator to control output pressure, which adds to the complexity and cost of the assembly. Some more recent lift pumps have been driven by brushless DC motors, which are more complex and expensive but provide increased reliability and the ability to control the output of the pump by varying power delivery to the motor.

Heat dissipation is an issue in both brushed DC and brushless DC motor-driven pump designs, with the fuel being pumped commonly serving as coolant for both the motor and any electronic components associated with an electronic controller used in conjunction with brushless DC motors. Most pumps of this type employ a "wet" configuration where the motor and/or controller are bathed in fuel as it is pumped through the assembly.

The consumption of fuel by an internal combustion engine varies widely, depending upon operational demands. In the absence of the ability to vary the rate of fuel delivery, the pump associated with a fuel delivery system must be operated at a constant fuel delivery rate sufficient to satisfy maximum engine demand for fuel. One result is that under most engine operating conditions, more fuel is delivered to the engine than is used, with excess fuel being returned to the fuel reservoir. Recirculated fuel is typically heated by passage through the fuel delivery system, and can potentially pick up particulates and contaminants that are returned to the fuel reservoir.

Brushless DC motors can overcome the reliability issues associated with brushed DC motors and present unique opportunities to control the speed and torque of the motor.

There is an opportunity to employ brushless DC motors in a fuel delivery system to match fuel delivery to engine demand and minimize the volume of fuel recirculated in such systems.

SUMMARY

The disclosed lift pump is arranged in a reinforced plastic subassembly housing configured to mount to a filter head. A gerotor pump is driven by a shaft extending from the rotor of an inrunner brushless DC motor. The gerotor pump and brushless DC motor are arranged in series and fuel flows through the pump and motor for cooling and lubrication. The brushless motor employs a specially configured motor end plate that also serves as the outlet plate of the gerotor pump, resulting in an integrated motor/pump. The brushless DC motor is a sensorless design that uses a back EMF technique to determine rotor position for control purposes. The disclosed lift pump drive circuit is arranged on a control (printed circuit) board contained in a sealed "dry" enclosure, situated in parallel with a longitudinal axis of the integrated motor/pump, but overlapping with the length of the motor/pump to maintain a spatially efficient assembly envelope.

The disclosed lift pump employs a unique arrangement of conductive studs to transmit the three phases of motor power from the control board to the brushless motor. The conductive studs penetrate the wall of the motor/pump enclosure, which is otherwise non-conductive. The conductive studs are intentionally larger than needed to transmit the current used by the motor, and are arranged in thermal contact with heat conductive portions of the motor control board to transmit heat from the control board into the motor/pump enclosure where heat is transmitted to fuel passing through the assembly. An additional center heat sink is situated in a position aligned with heat generating capacitors that are part of the motor drive circuitry on the motor control board.

Each of the studs and center heat sink are hermetically sealed where they pass through the wall of the subassembly housing. Thermal vias on the control board are used to conduct heat through the PC board, and the PC board is in thermal contact with the conductive studs and center heat sink to transmit heat through the wall of the subassembly housing where heat is released into the fuel being pumped. This arrangement keeps the motor drive circuitry cool, while isolating the circuit board from the fuel. The studs and center heat sink are zinc plated brass. The studs extend perpendicular to the longitudinal axis of the motor/pump and are received in corresponding spring terminals on the motor. Each of the studs has a threaded bore on the end facing the PC board, to establish positive alignment of the board during installation and maintain good electrical and thermal contact between the PC board and the studs.

In one embodiment, the studs extend from the sealed pocket enclosing the PC board into the fuel flowing through a housing surrounding the pump and motor for cooling of the PC board.

In one embodiment, the studs extend from the PC board to the brushless DC motor to provide electricity to the motor. The phases of the motor may be determined by the order and/or the timing of the electricity provided through the studs.

In one embodiment, the studs engage electrical connectors to provide an electrical connection from the PC board to the motor coils of the brushless DC motor. The connection between the studs and the electrical connectors provides adequate electrical connection over a range of orientations of the brushless DC motor relative to the PC board. The electrical connectors may move along the length of the studs and retain an electrical connection. The studs may move along the length of the electrical connectors and retain an electrical connection. The studs may rotate relative to the electrical connectors and retain an electrical connection.

In one embodiment, the electrical connector elastically deforms to grip the stud perpendicular to the length of the stud.

In one embodiment, one end of the studs defines a bore and apertures in the PC board aligned with the bores accommodate a fastener. This fastener may be electrically and thermally conductive to form part of the pathway between the studs and the electrical connectors.

In one embodiment, a heat sink extends through the wall of the pocket to provide a thermal pathway from the heat generating components of the PC board to the fuel flowing through a housing surrounding the pump and motor.

In one embodiment, the brushless DC motor is retained axially between the filter head and housing. The filter had may include a recess to locate the brushless DC motor within the assembly.

In one embodiment, the housing includes ribs to support the studs in a specific orientation.

In one embodiment, the brushless DC motor and pump is placed on the housing and the electrical connectors are aligned with the studs. The filter head is placed on the housing and the studs mate with corresponding electrical connectors. The brushless DC motor and pump may be placed in a recess of the filter head to ensure proper location and/or alignment. The connection between the electrical connectors and studs may be completed without the need for separate tools.

Alternative embodiments of the disclosed fuel filter assembly may incorporate one or more of the disclosed features and relationships included in the detailed description below.

DETAILED DESCRIPTION OF THE DISCLOSED EMBODIMENTS

Figure 1:
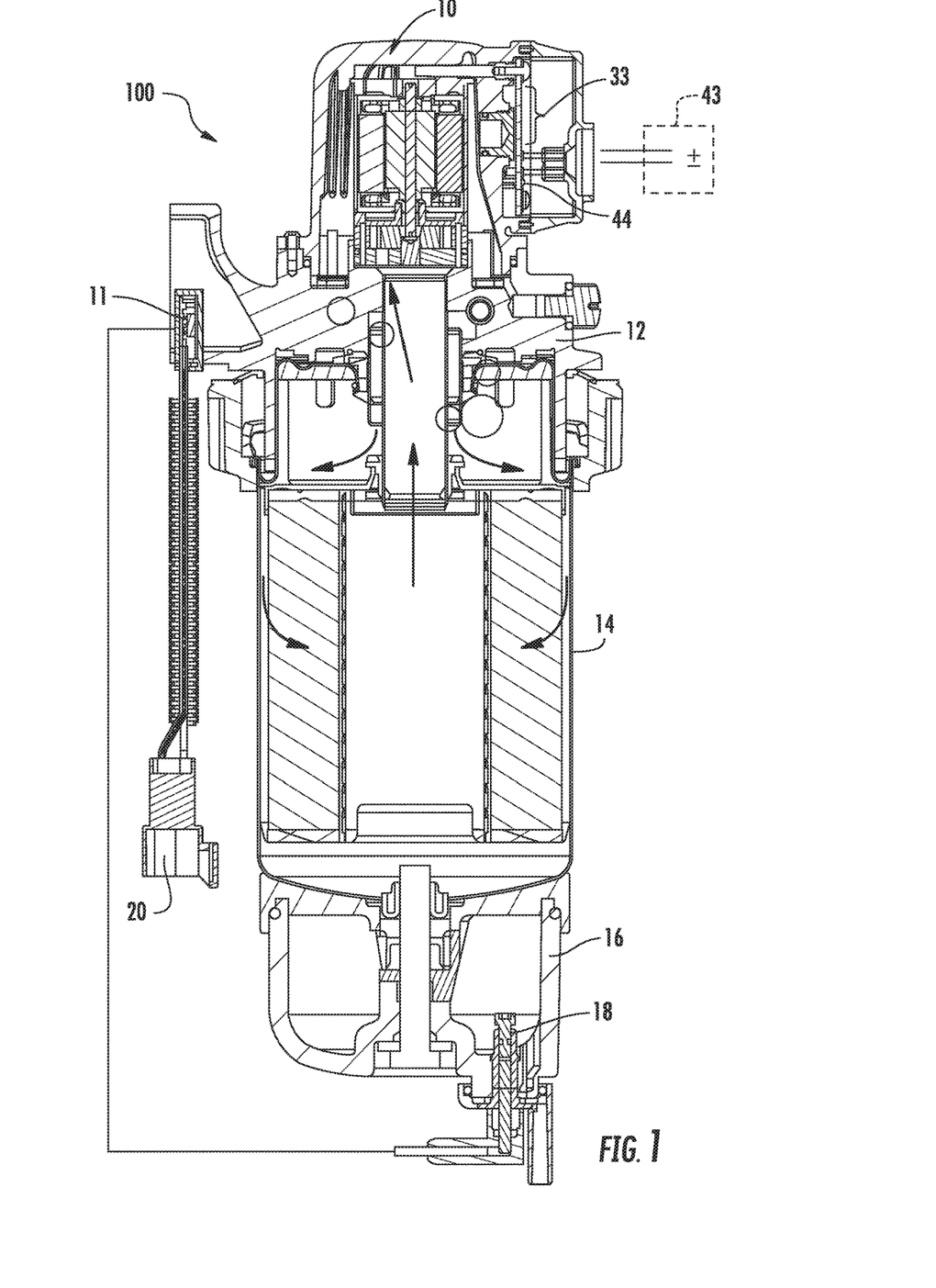
FIG. 1 is a sectional view through a fuel filter assembly incorporating the disclosed high pressure brushless DC pump with integrated water in fuel circuitry according to aspects of the disclosure.

A fuel delivery system includes a fuel filter assembly incorporating a brushless DC motor-driven pump assembly with integrated water in filter circuitry (hereafter "the lift pump 10") as shown in FIG. 1. The lift pump 10 is arranged to pull fuel through a filter cartridge 14 mounted to the filter assembly 100. In the disclosed fuel delivery system, the lift pump 10 is arranged as a sub-assembly secured to the top of a head 12 that connects a fuel flow path from a fuel reservoir to the fuel injection system of an internal combustion engine (not shown). The head 12 defines fuel flow paths for incoming fuel to be filtered and for clean fuel delivery to downstream fuel injection systems. The illustrated fuel filter assembly includes a water bowl 16 secured to the bottom of the filter cartridge 14, which has a water in fuel sensor arranged to detect accumulation of water in the bowl 16 and deliver a corresponding signal via water sensor 18. An electrical connector 20 delivers electrical power, ground and includes a conductor for the water present signal.

Figure 2:
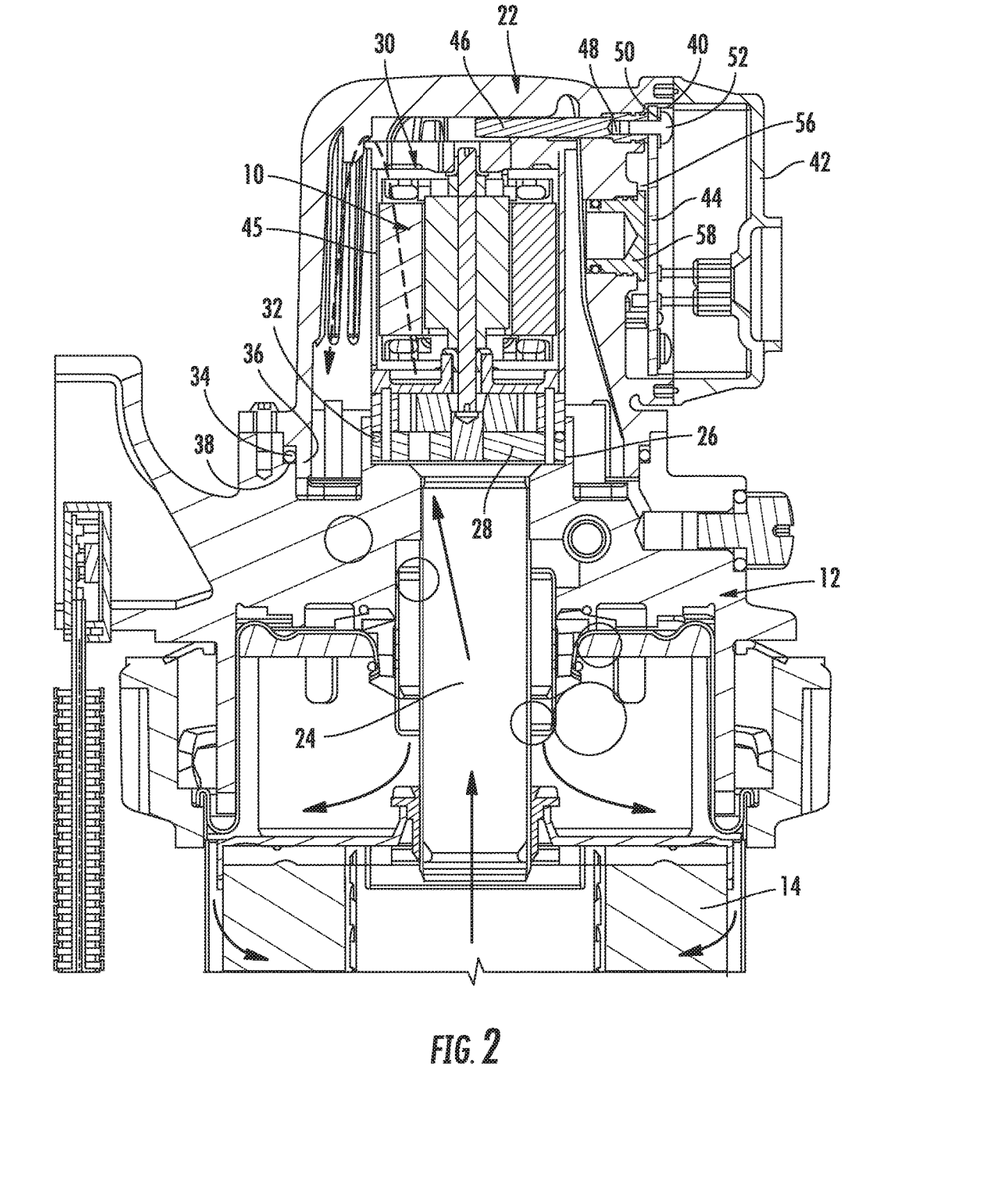
FIG. 2 is an enlarged sectional view through the high pressure brushless DC pump assembly of FIG. 1.
Figure 3:
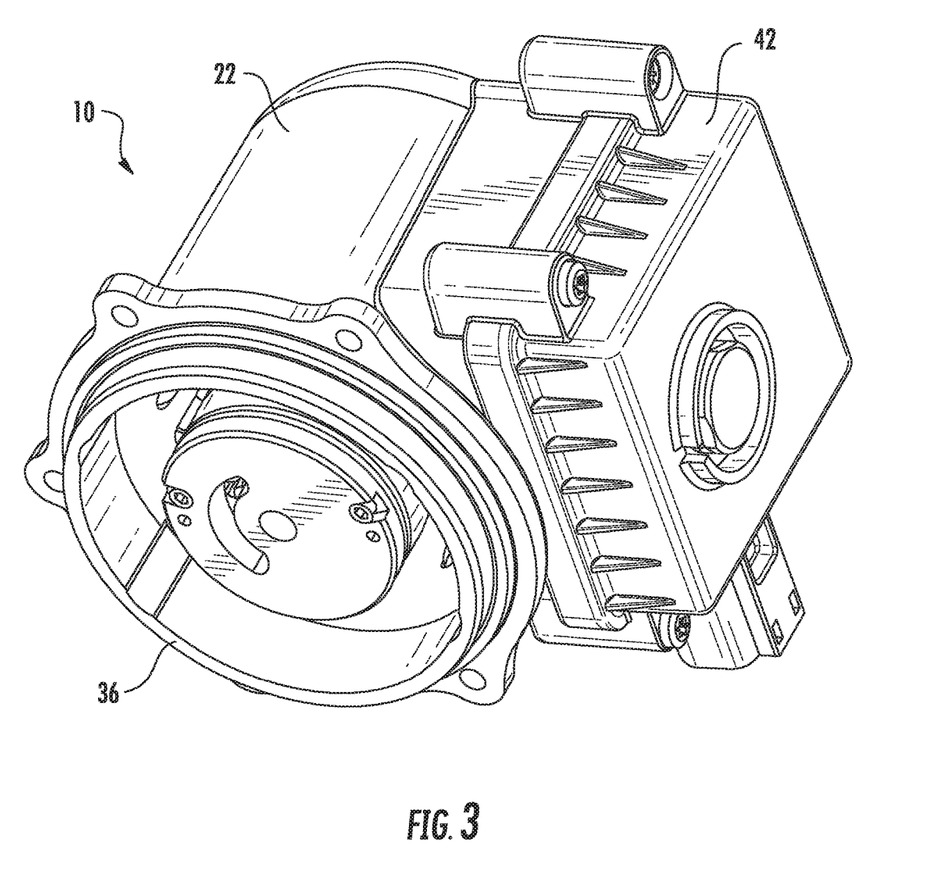
FIG. 3 is a bottom perspective view of the high pressure brushless DC pump assembly separated from the remainder of the filter assembly of FIG. 1.

The lift pump 10 is configured as a subassembly with its own housing 22 that spans openings at the top of the head 12 as best shown in FIG. 2. A clean fuel inlet 24 communicates with the clean region of the fuel filter assembly. The clean fuel inlet 24 is surrounded by an upstanding lip 26 that receives the inlet plate 28 of the integrated motor/pump assembly 30. The inlet plate 28 defines a gland for an O-ring seal 32 arranged to radially seal against the surrounding lip 26. The fuel filter 14 is on the suction side of the pump and this seal 32 separates the low pressure area inside the fuel filter from the pressure side of the pump, radially outward of the lip 26. A second seal 34 is contained in a gland defined by a lip 36 of the subassembly housing 22 and a shoulder 38 defined by the head 12. The second seal 34 contains pressurized fuel from the pump within the subassembly housing 22, which flows out of the head 12 toward downstream fuel injection system components (not shown).

Figure 4:
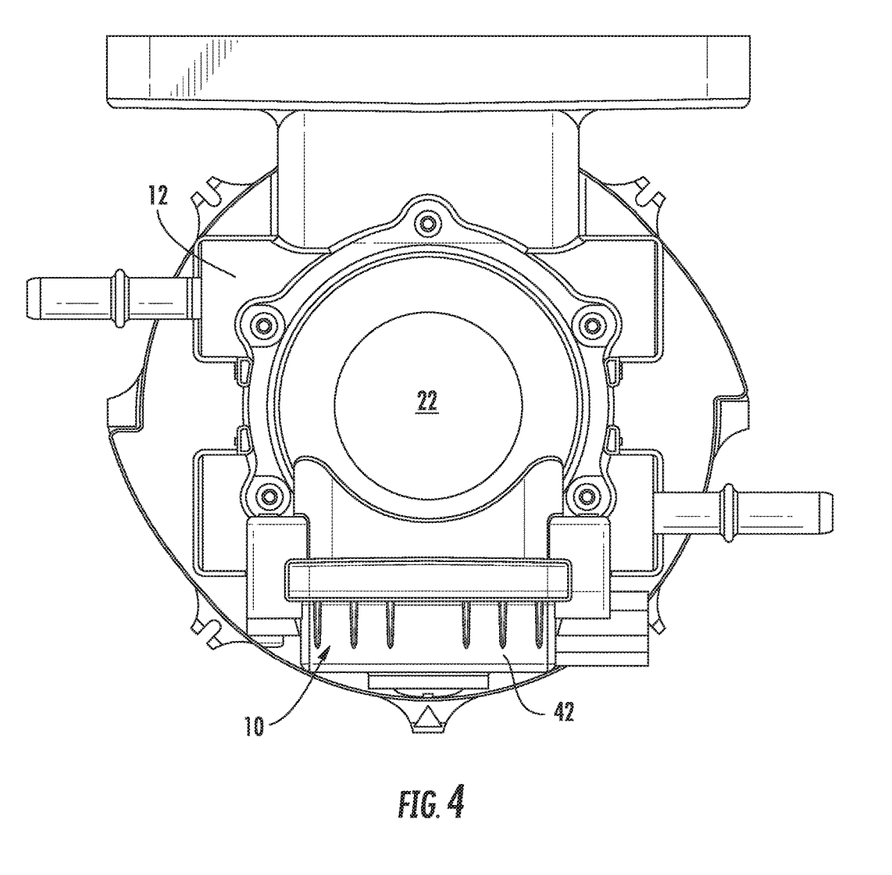
FIG. 4 is a top view of the fuel filter assembly of FIG. 1.
Figure 6:
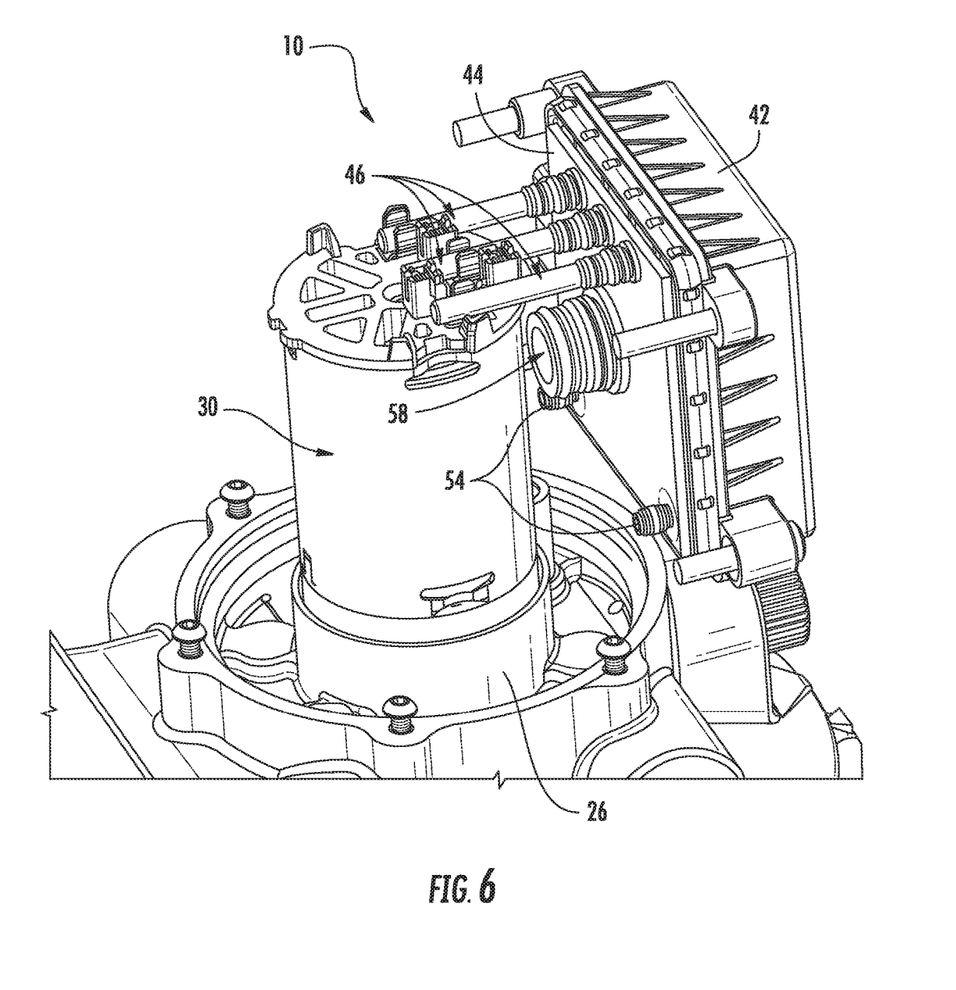
FIG. 6 is an enlarged perspective view of the fuel filter assembly of FIG. 1, with the subassembly housing removed to show internal components.
Figure 8:
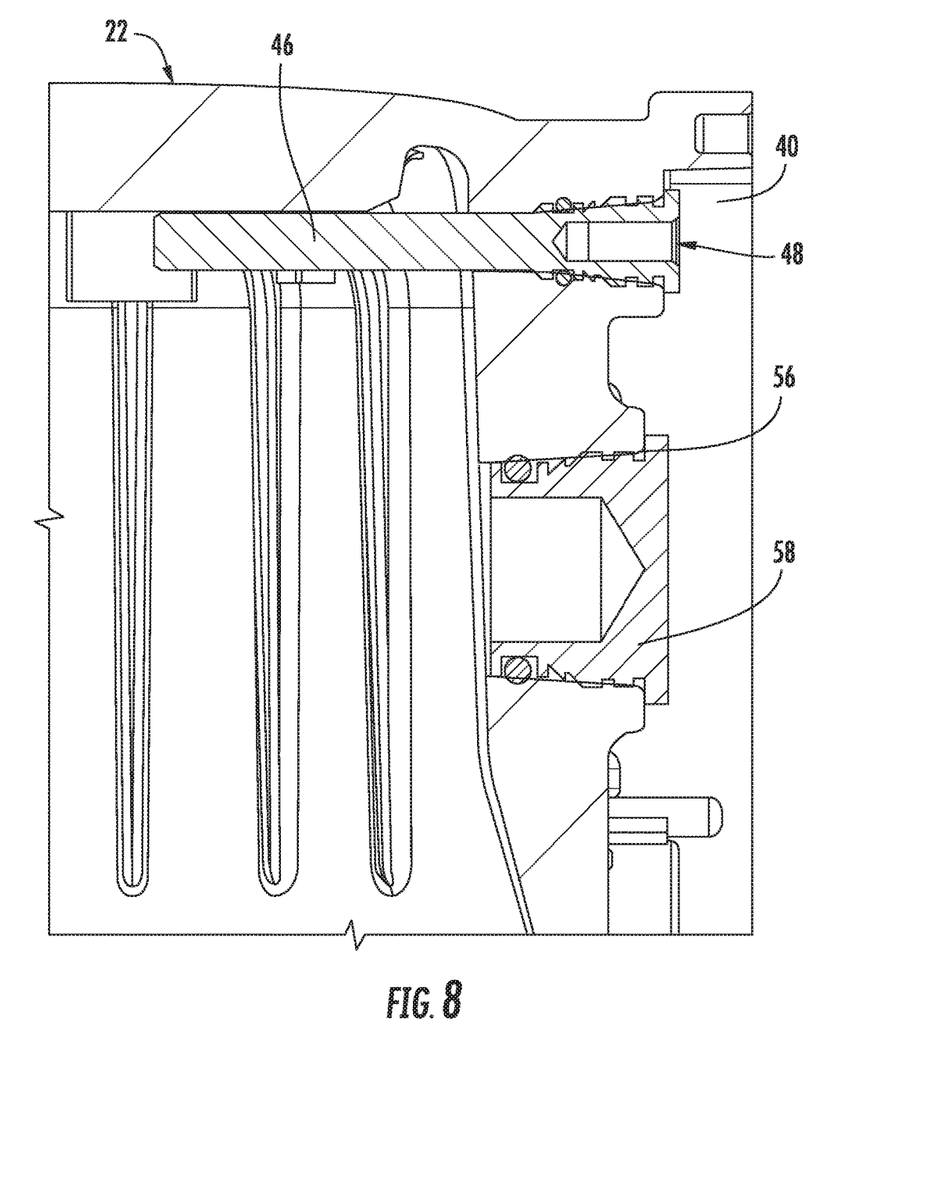
FIG. 8 is a partial sectional view through the wall of the subassembly housing showing phase conductor studs and a central heat sink according to aspects of the disclosure.
Figure 9:
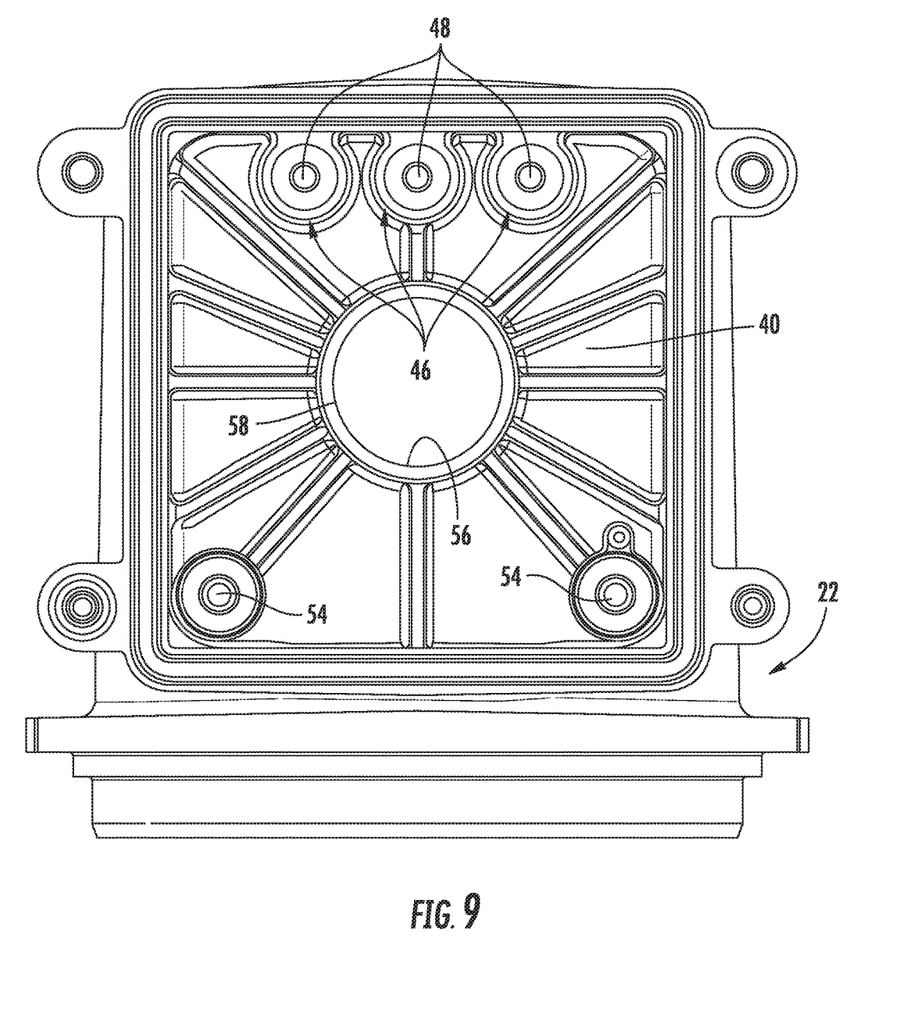
FIG. 9 is an exterior view of the subassembly housing showing the pocket for the control board and the position of phase conductor studs and central heat sink in the pocket.

As best shown in FIGS. 4 and 6, the subassembly housing 22 surrounds the integrated brushless DC motor/pump assembly 30 and is secured to the top of the head 12 by five screws. In the disclosed embodiment, the subassembly housing 22 is molded from fiber reinforced engineered plastic such as PBT or nylon. Referring to FIG. 2, the subassembly housing 22 defines a pocket 40 offset to one side of and axially overlapping with the motor/pump assembly 30. The pocket 40 and associated cover 42 define a sealed enclosure for the motor drive circuit 33 (depicted in FIG. 1) arranged on printed circuit board 44, which in the disclosed embodiment also includes integrated water in fuel circuitry. The disclosed brushless DC motor 45 requires three electrical connections to the printed circuit board 44. Three conductive posts 46 extend through the wall of the pocket 40 into the interior of the subassembly housing 22. The posts 46 are staked to the housing and carry a seal to eliminate the possibility of fuel leakage from the subassembly housing 22 as shown in FIGS. 6 and 8. Each of the posts 46 defines a threaded bore 48 open to the interior of the pocket 40. The printed circuit board 44 defines three fastener openings aligned with the threaded bores 48, each opening surrounded by a conductive land 50 associated with one of the three electrical connections from the printed circuit board 44 to the brushless motor 45. Three screws 52 (shown in FIG. 2) secure the printed circuit board 44 in the pocket 40 of the subassembly housing 22 and complete an electrical connection from the printed circuit board 44 to each of the three posts 46. Two additional threaded inserts 54 receive screws (not shown) to fasten the opposite (bottom) edge of the printed circuit board 44 in the pocket 40. As best shown in FIGS. 2, 8 and 9, the pocket 40 also defines a large opening 56 that is filled with a circular heat sink 58 having a flat surface arranged against the back side of the printed circuit board 44. Heat generating components of the control circuit, such as capacitors, are arranged in close proximity to the heat sink 58. The printed circuit board 44 is provided with thermally conductive features that transfer heat from the heat generating components to the back side of the printed circuit board 44 adjacent the heat sink 58. The end of the heat sink 58 opposite the printed circuit board 44 is exposed to fuel flowing through the subassembly housing 22. The posts 46 are also bathed in fuel where they extend into the subassembly housing 22. Together, the posts 46 and heat sink 58 reduce the temperature of the control board by approximately 15% by transferring heat generated by control circuit components to fuel flowing through the assembly.

The control board includes components necessary to generate a rotating magnetic field, which acts on permanent magnets on the rotor to generate torque to rotate the pump. Control circuit components include switching transistors, capacitors and other components operating under control of a microcontroller, which includes memory, a processor, input and output signal lines, as are known in the art. The disclosed control board employs "sensorless" motor control, which monitors the back EMF voltage in an undriven motor terminal during one of the drive phases, as is known in the art. Back EMF is directly proportional to the motor speed and is determined from the motor voltage constant Kv. In the disclosed embodiment, an exemplary control algorithm senses input voltage and current applied to the motor and employs the motor voltage and torque constants, Kv and Kt, to maintain a constant pressure at the outlet of the fuel delivery system 100. As demand from the downstream equipment changes, the energy necessary to maintain a constant pressure at the output of the fuel delivery system 100 will vary, and the disclosed control algorithm will adjust electrical energy applied to the brushless DC motor 45 accordingly. The disclosed brushless DC motor control algorithm will match the output of the fuel delivery system to engine demand, minimizing the quantity of recirculated fuel and extending the useful life of all fuel delivery system components, such as fuel filter elements, motors, and pumps. The disclosed fuel delivery system eliminates the need for a costly mechanical pressure regulator and by minimizing the quantity of recirculated fuel, reduces heat buildup in the fuel reservoir.

Figure 5:
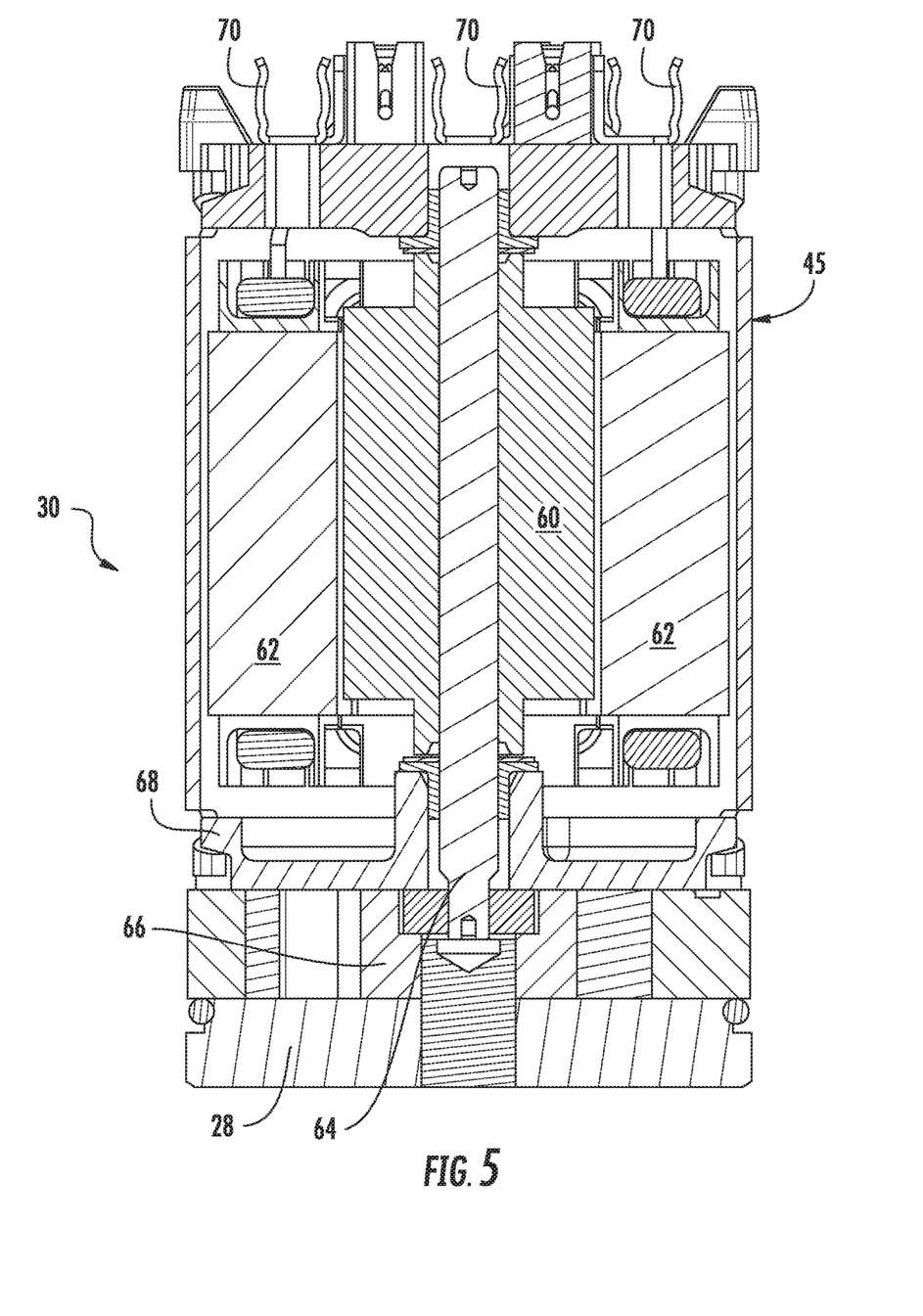
FIG. 5 is a sectional view through a disclosed brushless DC motor and integrated pump.
Figure 7A:
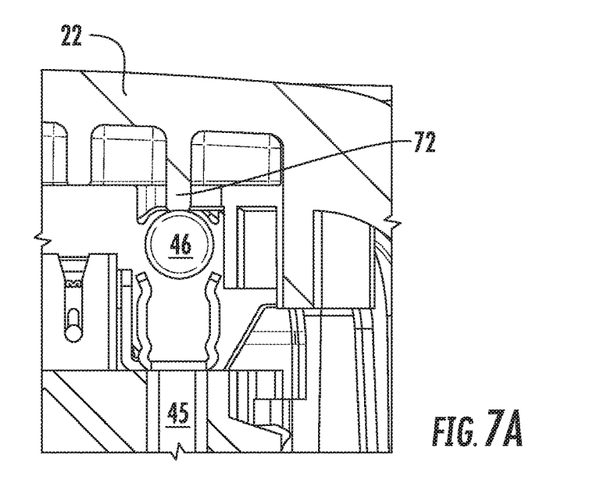
FIGS. 7A-7C are enlarged detail views of spring clips on the disclosed brushless DC motor receiving conductive studs according to aspects of the disclosure.
Figure 7B:
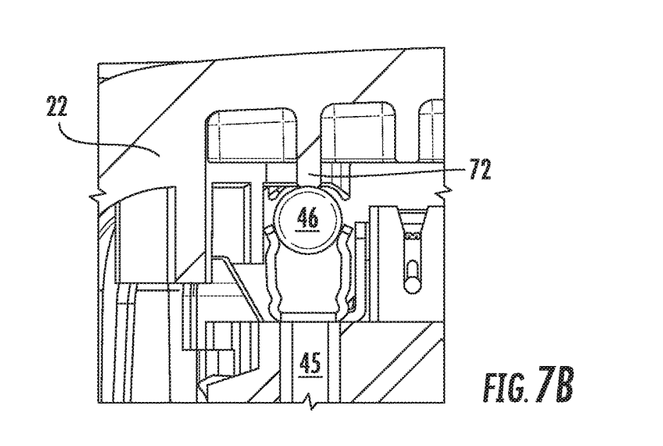
Figure 7C:
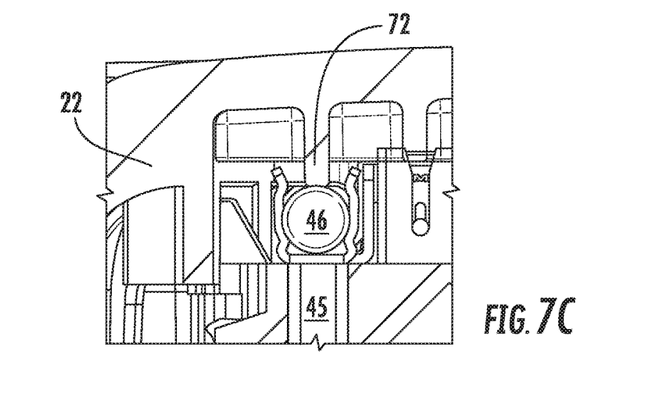

FIG. 5 illustrates the motor/pump assembly 30. The brushless DC motor 45 is an inrunner configuration, with a rotor 60 arranged to rotate inside a fixed stator 62. A shaft 64 extends from the rotor 60 and is coupled to the inner part of a gerotor pump 66. The gerotor pump 66 includes inner and outer gerotor components that rotate between an inlet plate 28 and an outlet plate 68 which also serves as the end shield of the motor 45. Ordinarily, the motor end shield would be a separate component and would define an opening for the pump outlet port. In the prior art configuration, the gerotor pump would include its own, separate outlet plate. In the disclosed embodiment, the material and configuration of the motor end shield/outlet plate 68 are selected so that the motor end shield doubles as the outlet plate of the gerotor pump 66, eliminating the separate outlet plate. The combined motor end shield/outlet plate 68 will work with either a gerotor or roller vane type pump. Three spring clip electrical connectors 70 extend from the top of the motor 45 in positions aligned with the three posts 46 extending into the subassembly housing 22. As shown in FIGS. 3, and 7A-7C, the motor/pump assembly 30 is inserted into the subassembly housing 22 to engage the posts 46 with the three electrical connectors 70, which serve to temporarily retain the motor/pump assembly 30 within the subassembly housing 22. Ribs 72 molded on the interior of the subassembly housing 22 support each of the posts 46 during insertion of the posts 46 into the electrical connectors 70 as shown in FIGS. 7A-7C. The subassembly housing 22 and motor/pump assembly 30 are then lowered onto the filter head 12 and secured in place by five screws as shown in FIGS. 4 and 6. The motor/pump assembly 30 is trapped between the head 12 and the subassembly housing 22, which is secured in place with screws. As shown in FIG. 2, fuel is routed through the motor 45 before leaving the subassembly housing 22.

FIG. 1 illustrates a filter assembly 100 incorporating a water-in-filter (WIF) circuit 11 and related water sensor 18. The water sensor 18 is situated in a water bowl 16 suspended from the lower end of a filter cartridge 14. A connector 20 and wires bring power and ground to the WIF circuit 11 and send a "water present" signal from the WIF circuit 11 to other systems, where the water present signal may be used to light an indicator or activate an automated water drain mechanism. A connector 43 delivers power and ground to the printed circuit board 44.

Figure 10:
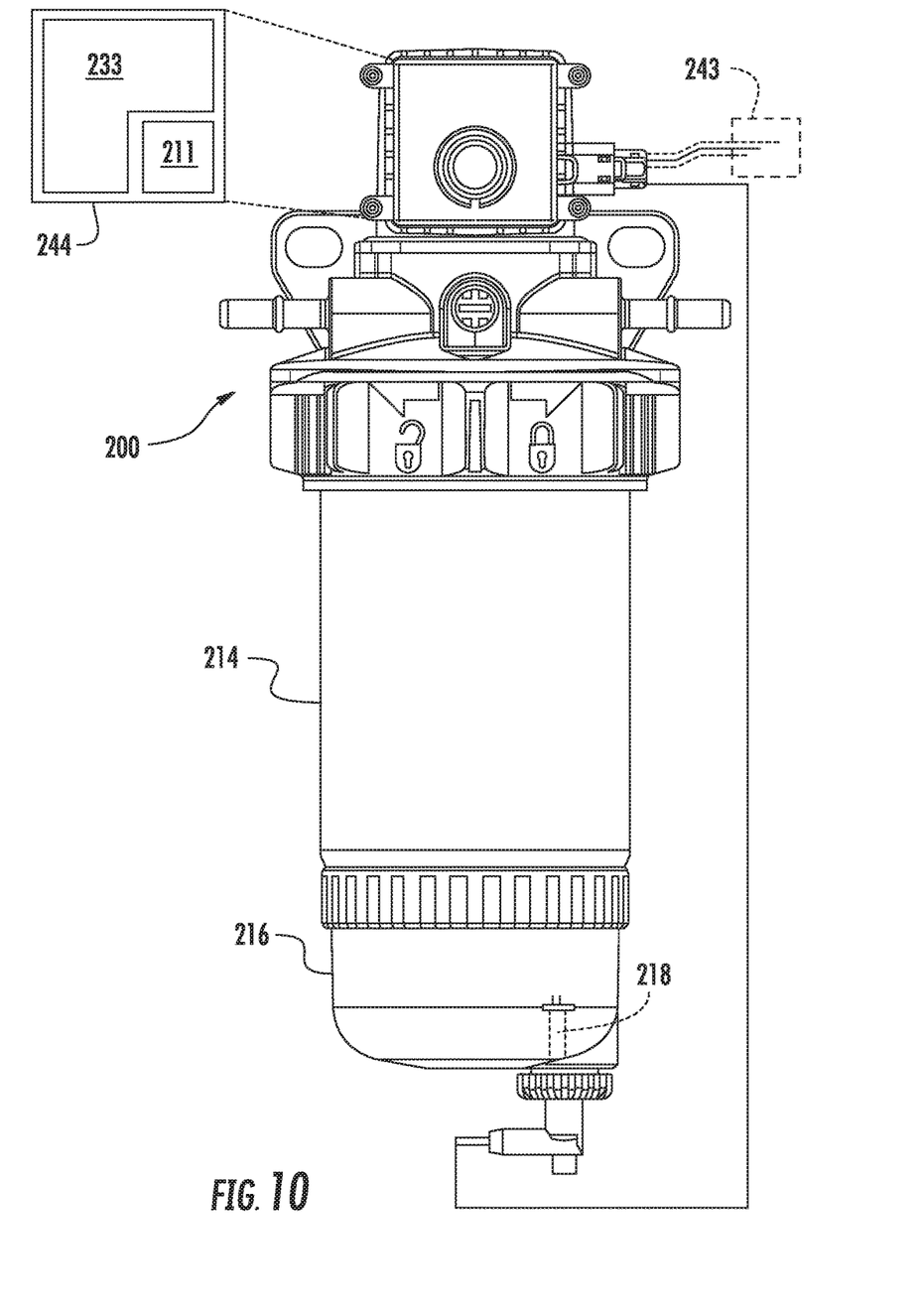
FIG. 10 is an exterior view of a fuel filter assembly incorporating the disclosed high pressure brushless DC pump with integrated water in fuel circuitry.

FIG. 10 illustrates an alternative filter assembly 200, which is similar in structure and function to the filter assembly 100 described above. In the embodiment of FIG. 10, the WIF circuit 211 is arranged on the same PC board 244 as the motor drive circuit 233. The circuits 211, 233 can share the power and ground from connector 243, but may otherwise be functionally separate circuits. It may be necessary to provide some buffering, shielding, and/or noise protection for the WIF circuit 211, given its close proximity to the active motor drive circuit 233. Connector 243 may be a four conductor arrangement with room for power, ground, incoming signal from the water sensor 218 and an outgoing "water present" signal. This disclosed arrangement significantly reduces the part count and cost of connecting the filter assembly 200 to the host equipment (not shown).

What is claimed:

1. A fluid circulation assembly comprising:
   a housing defining a pumping chamber having an inlet and an outlet;
   a motor-driven pump assembly mounted in said pumping chamber and configured to pump fluid from the inlet to the outlet of said pumping chamber, said pump secured to a first axial end of said motor and connected to a shaft of said motor to receive rotational force generated by said motor, said pump and motor configured so that fluid flows axially through the motor and pump, said motor including a plurality of motor coils and a plurality of electrical connectors for receiving electrical energy to be delivered to said motor coils;
   a pocket defined on an exterior surface of said housing, a wall of said housing separating said pocket from said pumping chamber;
   a motor drive circuit arranged on a printed circuit board mounted in said pocket, said motor drive circuit including heat generating electrical components in thermal communication with said printed circuit board, said printed circuit board including a plurality of electrically and thermally conductive lands; and
   a plurality of electrically and thermally conductive studs extending through the wall of said housing, a first end of each stud defining a bore open to said pocket, and a shaft of each said stud projecting into said pumping chamber in an orientation substantially perpendicular to an axis of said motor-driven pump assembly;
   wherein each stud is in electrical and thermal contact with each land, the shaft of each stud is received in one of said electrical connectors to deliver electrical energy from said motor drive circuit to said motor, and the shaft of each stud is bathed in fluid pumped through said pumping chamber, each stud defining a thermal path for heat from said printed circuit board to be absorbed by fluid pumped through said pumping chamber, thereby cooling the heat generating components of said motor drive circuit.

2. The fluid circulation assembly of claim 1, wherein said motor is a brushless DC motor, said fluid circulation system comprising three electrical connectors on said motor, three electrically and thermally conductive studs and three thermally conductive lands, said motor drive circuit generating a three phase drive signal, each phase delivered to said brushless DC motor through a path comprising an electrically and thermally conductive land, an electrically and thermally conductive stud and an electrical connector.

3. The fluid circulation assembly of claim 1, wherein the first end of each said stud defines a bore, each said electrically and thermally conductive land defines an aperture aligned with the bore and a fastener extends through said aperture into said bore to secure the printed circuit board to said housing.

4. The fluid circulation assembly of claim 3, wherein said bore is threaded and said fastener is a threaded fastener.

5. The fluid circulation assembly of claim 4, wherein said threaded fastener is electrically and thermally conductive and forms part of a thermal pathway from heat generating components on said printed circuit board to said electrically and thermally conductive studs.

6. The fluid circulation assembly of claim 4, wherein each said stud carries a seal, the wall of said housing is formed from plastic, and each said stud is fixed in said wall with said seal preventing fluid flow around said stud between said pumping chamber and said pocket.

7. The fluid circulation assembly of claim 1, comprising a heat sink of thermally conductive material extending through the wall and including a first surface inside the pocket and in thermal communication with the printed circuit board, a second surface of said heat sink exposed to fluid circulating through said pumping chamber, said heat sink providing a thermal pathway from said printed circuit board to said fluid.

8. The fluid circulation assembly of claim 1, wherein each said clip is configured to elastically grip the shaft of each said stud in a direction perpendicular to the length of the stud.

9. The fluid circulation assembly of claim 1, wherein said fluid circulation assembly is a fuel filter assembly comprising:
   a filter head defining fluid flow paths between an inlet and an outlet and directed fuel through filter media in a filter enclosure, said filter head defining a recess open to said filter enclosure;
   said housing configured to mount to said filter head so that said pumping chamber is in fluid communication with said recess;
   said motor driven pump assembly configured to seat in said recess with said pump in said recess and said electrical connectors projecting from an axial end of said motor driven pump assembly opposite said pump;
   said motor driven pump assembly retained in said recess by said housing.

10. The fluid circulation assembly of claim 9, wherein said housing mounts axially over said motor driven pump assembly and the shafts of said studs are engaged into said electrical connectors during axial installation of said housing to said filter head.

11. A method of delivering electrical energy to a motor driven pump assembly in a fluid circulation apparatus, said method comprising the steps of:
   providing a housing defining a pumping chamber having an inlet and an outlet;
   providing a motor driven pump assembly having a rotational axis and having a plurality of electrical connectors at a first axial end;
   mounting the motor driven pump assembly in said pumping chamber where the motor driven pump assembly is surrounded by the fluid being pumped;
   defining a pocket on an exterior surface of said housing, a wall of said housing separating said pocket from said pumping chamber;
   securing a motor drive circuit within said pocket, said motor drive circuit including heat generating components mounted to a printed circuit board;
   penetrating said wall with a plurality of thermally and electrically conductive studs, each stud being sealed to said wall to prevent fluid flow past the stud and having a first end defining a bore open to said pocket, each stud including a shaft projecting into said pumping chamber in an orientation substantially perpendicular to an axis of said motor driven pump assembly, received in one of said electrical connectors to deliver energy from said motor drive circuit to said motor, and surrounded by the fluid being pumped;
   fastening said printed circuit board to said plurality of studs so that each stud is in electrical and thermal contact with said printed circuit board; and
   placing the housing over the motor driven pump assembly so that the shaft of each said stud is elastically gripped by one of said electrical connectors;
   wherein each stud defines a thermal path for heat from said printed circuit board to be absorbed by fluid pumped through said pumping chamber, thereby cooling the heat generating components of said motor drive circuit.

12. The method of claim 11, wherein said step of penetrating said wall with a plurality of thermally and electrically conductive studs comprises:
   positioning the studs adjacent a first end of said housing and providing each stud with a support projecting from the first end of said housing, said support resisting movement of said stud in a direction toward the first end of said housing.

13. The method of claim 12, comprising:
   constructing each said electrical connector to have an opening directed away from said motor first end.

14. The method of claim 11, comprising:
   forming said housing from plastic; and
   forming said studs from plated brass.

* * * * *